(12) United States Patent
Matsuda

(10) Patent No.: US 11,709,641 B2
(45) Date of Patent: *Jul. 25, 2023

(54) PRINT CONTROL DEVICE, PRINT CONTROL METHOD, AND STORAGE MEDIUM

(71) Applicant: CANON KABUSHIKI KAISHA, Tokyo (JP)

(72) Inventor: Shoichi Matsuda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,850

(22) Filed: Jun. 17, 2022

(65) Prior Publication Data

US 2022/0317956 A1 Oct. 6, 2022

Related U.S. Application Data

(63) Continuation of application No. 17/330,474, filed on May 26, 2021, now Pat. No. 11,403,054.

(30) Foreign Application Priority Data

Jun. 16, 2020 (JP) .............................. JP2020-103579

(51) Int. Cl.
*G06F 3/12* (2006.01)
*B65H 9/00* (2006.01)

(52) U.S. Cl.
CPC ............. *G06F 3/1254* (2013.01); *B65H 9/00* (2013.01); *B65H 2511/10* (2013.01); *B65H 2551/26* (2013.01)

(58) Field of Classification Search
CPC ..... G06F 3/1254; B65H 9/00; B65H 2511/10; B65H 2551/26
USPC ................................ 358/1.15, 1.1, 1.14, 1.13
See application file for complete search history.

(56) References Cited

U.S. PATENT DOCUMENTS

| 11,403,054 | B2* | 8/2022 | Matsuda | G06F 3/1254 |
| 2010/0092189 | A1 | 4/2010 | Shimizu | |
| 2011/0188080 | A1* | 8/2011 | Chigusa | G06F 15/00 358/1.15 |
| 2015/0160902 | A1* | 6/2015 | Tsujita | G06F 3/1257 358/1.6 |
| 2015/0317107 | A1* | 11/2015 | Kikuchi | G06F 3/1229 358/1.15 |

(Continued)

FOREIGN PATENT DOCUMENTS

JP 2007-156630 A 6/2007

*Primary Examiner* — Frantz Bataille
(74) *Attorney, Agent, or Firm* — Venable LLP

(57) ABSTRACT

To provide a print control device, print control method, and storage medium with which, in a form where information related to the size of a sheet which is set in a printing apparatus is obtained and the size corresponding to the obtained information is displayed, the size corresponding to the obtained information is displayed more appropriately, in a case where the size corresponding to the information obtained by an obtaining unit matches any of multiple custom sizes corresponding to information stored by a storage unit before the information is obtained by the (Continued)

obtaining unit, all of the multiple custom sizes corresponding to the information stored by the storage unit before the information is obtained by the obtaining unit are displayed.

18 Claims, 14 Drawing Sheets

(56) References Cited

U.S. PATENT DOCUMENTS

2020/0314266 A1    10/2020    Hattori

* cited by examiner

205

| ROLL SHEET WIDTH ID | ROLL SHEET WIDTH NAME | SIZE |
|---|---|---|
| ID_60INCH_ROLL | 60 INCH ROLL (1524.0 mm) | 1524.0 |
| ID_42INCH_ROLL | 42 INCH ROLL (1066.8 mm) | 1066.8 |
| ID_24INCH_ROLL | 24 INCH ROLL (609.6 mm) | 609.6 |
| ID_A2A3_ROLL | ISO A2/A3 ROLL (420.0 mm) | 420.0 |
| ID_16INCH_ROLL | 16 INCH ROLL (406.4 mm) | 406.4 |
| ID_14INCH_ROLL | 14 INCH ROLL (355.6 mm) | 355.6 |
| ID_CUSTOM1_ROLL | CUSTOM SIZE 1 | 450.0 |
| ID_CUSTOM2_ROLL | CUSTOM SIZE 2 | 350.0 |
| ID_CUSTOM3_ROLL | CUSTOM SIZE 3 | 1100.0 |

FIG.6

IN A CASE OF RECEIVING THE CUSTOM SIZE 1100 MM

PRINT CONTROL DEVICE, PRINT CONTROL METHOD, AND STORAGE MEDIUM

This application is a continuation of application Ser. No. 17/330,474, filed May 26, 2021.

BACKGROUND OF THE INVENTION

Field of the Invention

The present invention relates to a print control device, print control method, and storage medium for performing printing with a printing apparatus connected to a host computer.

Description of the Related Art

A printer driver installed on a host computer as software for controlling a printing apparatus in general holds the widths of multiple standard roll sheets as preset values so that it is possible to handle printing of multiple widths according to the purpose of printing. Further, it is also known that a printer driver can register a custom roll sheet width so that the user can perform printing with a given roll sheet width.

In Japanese Patent Laid-Open No. 2007-156630, there is described that, in a printer driver installed in a host computer as software for controlling a printing apparatus, the width of a roll sheet which is set in the printing apparatus is obtained and reflected in the roll sheet widths of the printer driver.

By the way, as a form of obtaining information related to the size of a sheet which is set in a printing apparatus and displaying the size corresponding to the obtained information becomes widespread, it is desired that the size corresponding to the obtained information is displayed more appropriately.

SUMMARY OF THE INVENTION

Therefore, the present invention provides a print control device, print control method, and storage medium with which, in a form where information related to the size of a sheet which is set in a printing apparatus is obtained and the size corresponding to the obtained information is displayed, the size corresponding to the obtained information can be displayed more appropriately.

Therefore, the print control device of the preset invention is a print control device that is connectable to a printing apparatus, the print control device including: a storage unit configured to store information related to multiple custom sizes which are set by accepting input of a value from a user; an obtaining unit configured to obtain information related to a size of a sheet which is set in the printing apparatus; and a display unit configured so that, in a case where the size corresponding to the information obtained by the obtaining unit does not match any of the multiple custom sizes corresponding to the information stored by the storage unit before the information is obtained by the obtaining unit, a specific custom size among the multiple custom sizes corresponding to the information stored by the storage unit before the information is obtained by the obtaining unit is not displayed, and the size corresponding to the information obtained by the obtaining unit and the at least one custom size other than the specific custom size among the multiple custom sizes corresponding to the information stored by the storage unit before the information is obtained by the obtaining unit are displayed, and, in a case where the size corresponding to the information obtained by the obtaining unit matches any of the multiple custom sizes corresponding to the information stored by the storage unit before the information is obtained by the obtaining unit, all of the multiple custom sizes corresponding to the information stored by the storage unit before the information is obtained by the obtaining unit are displayed.

According to the present invention, it is possible to provide a print control device, print control method, and storage medium with which, in a form where information related to the size of a sheet which is set in a printing apparatus is obtained and the size corresponding to the obtained information is displayed, the size corresponding to the obtained information can be displayed more appropriately.

Further features of the present invention will become apparent from the following description of exemplary embodiments with reference to the attached drawings.

BRIEF DESCRIPTION OF THE DRAWINGS

FIG. 6 is a diagram illustrating a roll sheet width list held by the printer driver;

DESCRIPTION OF THE EMBODIMENTS

First Embodiment

Hereinafter, an explanation will be given of the first embodiment of the present invention with reference to the drawings.

Figure 1:
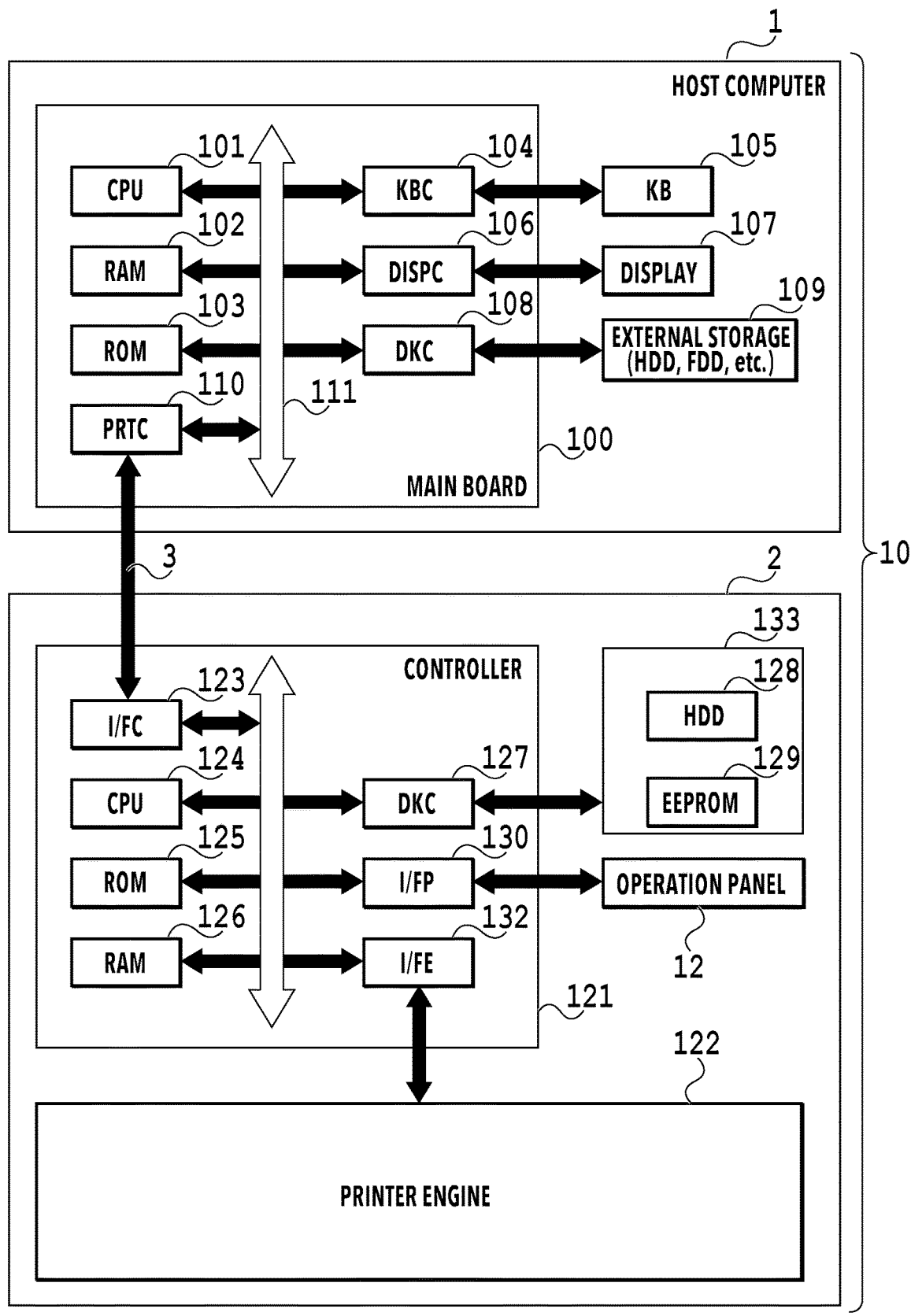
FIG. 1 is a block diagram illustrating a print system.

FIG. 1 is a block diagram illustrating a print system 10 to which the present embodiment can be applied. The print system 10 includes a host computer (hereinafter also simply referred to as a host) 1 and a printer 2 connected to the host 1 via a bi-directional interface 3.

A typical example of the host 1 is a personal computer (PC) or the like. The host 1 is equipped with a main board 100 including a CPU 101, etc., a keyboard (KB) 105, a display (DISPLAY) 107 such as an LCD, and an external storage 109 such as a hard disk (HDD) and a flexible disk (FDD). The main board 100 is further equipped with a RAM 102, a ROM 103, a keyboard controller (KBC) 104, a display controller (DISPC) 106, a disk controller (DKC) 108, and a printer controller (PRTC) 110.

The CPU 101 comprehensively controls each of the above-mentioned constituent elements connected to a system bus 111 and executes various kinds of programs. The keyboard controller (KBC) 104 controls input from the keyboard 105 and a pointing device (not illustrated in the drawing). Hereinafter, the keyboard controller 104 is also referred to as an operation part or an input part. The display controller (DISPC) 106 controls displaying of the display 107. The RAM 102 functions as a main memory or work area of the CPU 101.

The ROM 103 stores an operating system, a program for executing each function including a printer driver according to the present embodiment, a boot program, various kinds of applications, a printer control command generation program (hereinafter, a printer driver), etc. The disk controller (DKC) 108 controls access to the external storage 109 such as a hard disk or flexible disk (registered trademark). The printer controller (PRTC) 110 is connected to the printer 2 via the bi-directional interface 3 and controls communication processing of data and commands with the printer 2.

The printer 2 is connected to the host 1 via the bi-directional interface 3 such as USB or TCP/IP, for example. The printer 2 is equipped with a controller 121, a printer engine 122, an operation panel 12, and a non-volatile storage device 133. The non-volatile storage device 133 includes a hard disk (HDD) 128 or EEPROM 129. Hereinafter, the non-volatile storage device is also referred to as a non-volatile memory. The controller 121 includes a CPU 124, a ROM 125, a RAM 126, an interface controller (I/FC) 123, a disk controller (DKC) 127, a panel interface (I/FP) 130, and an engine interface (I/FE) 132. The CPU 124 executes various kinds of programs.

The ROM 125 receives print image data and commands from the host 1 and stores programs and various kinds of data for controlling the printer engine 122 to implement optimum recording. The RAM 126 is used as a work area for temporarily storing various kinds of data and various kinds of programs. The interface controller (I/FC) 123 is connected to the host 1 via the bi-directional interface 3 and controls the communication processing of data and commands with the host 1. The hard disk (HDD) 128 stores a large amount of data such as data from the host 1 and ancillary information related to the data.

The EEPROM 129 stores information unique to a recording apparatus used during a recording operation. The disk controller (DKC) 127 controls access to the non-volatile storage device 133. The panel interface (I/FP) 130 controls displaying on the operation panel 12 and inputting from the operation panel 12. The engine interface (I/FE) 132 controls the printer engine 122 for directly controlling hardware to implement optimum recording.

Note that, although a printer engine using an inkjet recording method is used as the printer engine 122 in the present embodiment, it is also possible to use a printer engine or offset printing machine that complies with an electrophotographic method.

Figure 2:
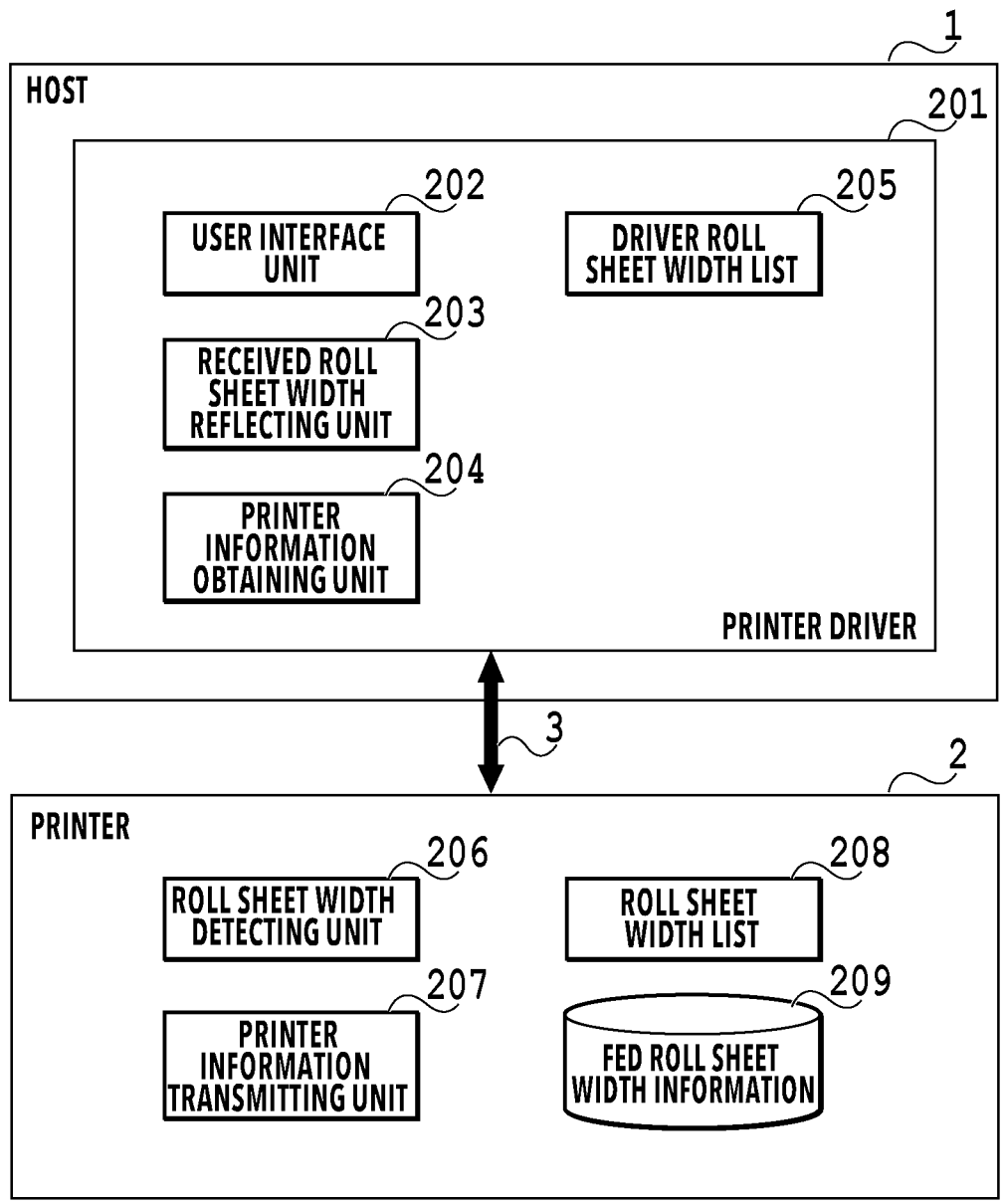
FIG. 2 is a functional block diagram illustrating a functional configuration of the print system.

FIG. 2 is a functional block diagram illustrating a functional configuration of the print system 10. The host 1 that is connectable to a printer is equipped with a printer driver 201, and the printer driver 201 is equipped with a user interface unit 202, a received roll sheet width reflecting unit 203, a printer information obtaining unit 204, and a driver roll sheet width list 205. The user interface unit 202 provides the user with an input unit for inputting a print setting of the printer driver. The printer driver 201 displays a print settings screen on the DISPLAY 107, based on a display command for the print settings screen from the operating system. The user interface unit 202 internally holds information related to the functions of the printer 2 and displays the print settings screen based on the information. As a function related to roll sheet widths, the user interface unit 202 displays a roll sheet width list box based on the roll sheet width list 205 held by the printer driver 201.

The roll sheet width list 205 of the present embodiment contains information indicating multiple (three in the present embodiment) custom roll sheet widths in addition to information of a standard-sized roll sheet width which is a predetermined roll sheet width corresponding to the printer 2. In other words, the standard-sized roll sheet width is a roll sheet width which is preset for the printer driver 201 without accepting a setting/input of a value of a width from the user on the host 1. Further, in a case where a custom size (custom roll sheet width) is selected by the user from the roll sheet width list box, the user interface unit 202 displays a roll sheet width settings screen and holds the set size in the roll sheet width list 205.

That is, the custom roll sheet width is a sheet width which is arbitrarily set and input by the user on the host 1. A predetermined number of custom sizes can be set as a maximum. The printer information obtaining unit 204 communicates with the printer 2 and receives various kinds of information of a printer such as fed roll sheet width information 209 (the sheet width of the roll sheet which is set in the printer 2) detected by the printer 2.

Note that, as described above, although the sheet width of the roll sheet is controlled (set, stored, and displayed) as the sheet size in the present embodiment, the present embodiment is not limited to this form. For example, it is also possible that the portrait and landscape lengths or the aspect ratio of a sheet is controlled as the sheet size.

The printer 2 is equipped with a roll sheet width detecting unit 206, a printer information transmitting unit 207, a printer roll sheet width list 208, and fed roll sheet width information 209. The roll sheet width detecting unit 206 detects the width of the roll sheet which is fed (set) in the printer 2 and saves the detected roll sheet width as the fed roll sheet width information 209. In a case of receiving a printer information obtaining request from the printer driver 201, the printer information transmitting unit 207 transmits the printer information such as the saved fed roll sheet width information 209 to the printer driver 201. The roll sheet width list 208 contains information of a standard roll sheet width corresponding to the printer 2. Although being named separately in the present embodiment for the sake of explanation, the roll sheet width list 205 held by the printer driver 201 and the roll sheet width list 208 held by the printer 2 each include information of the same standard roll sheet widths. Details of the information held in each list will be described later.

Figure 3:
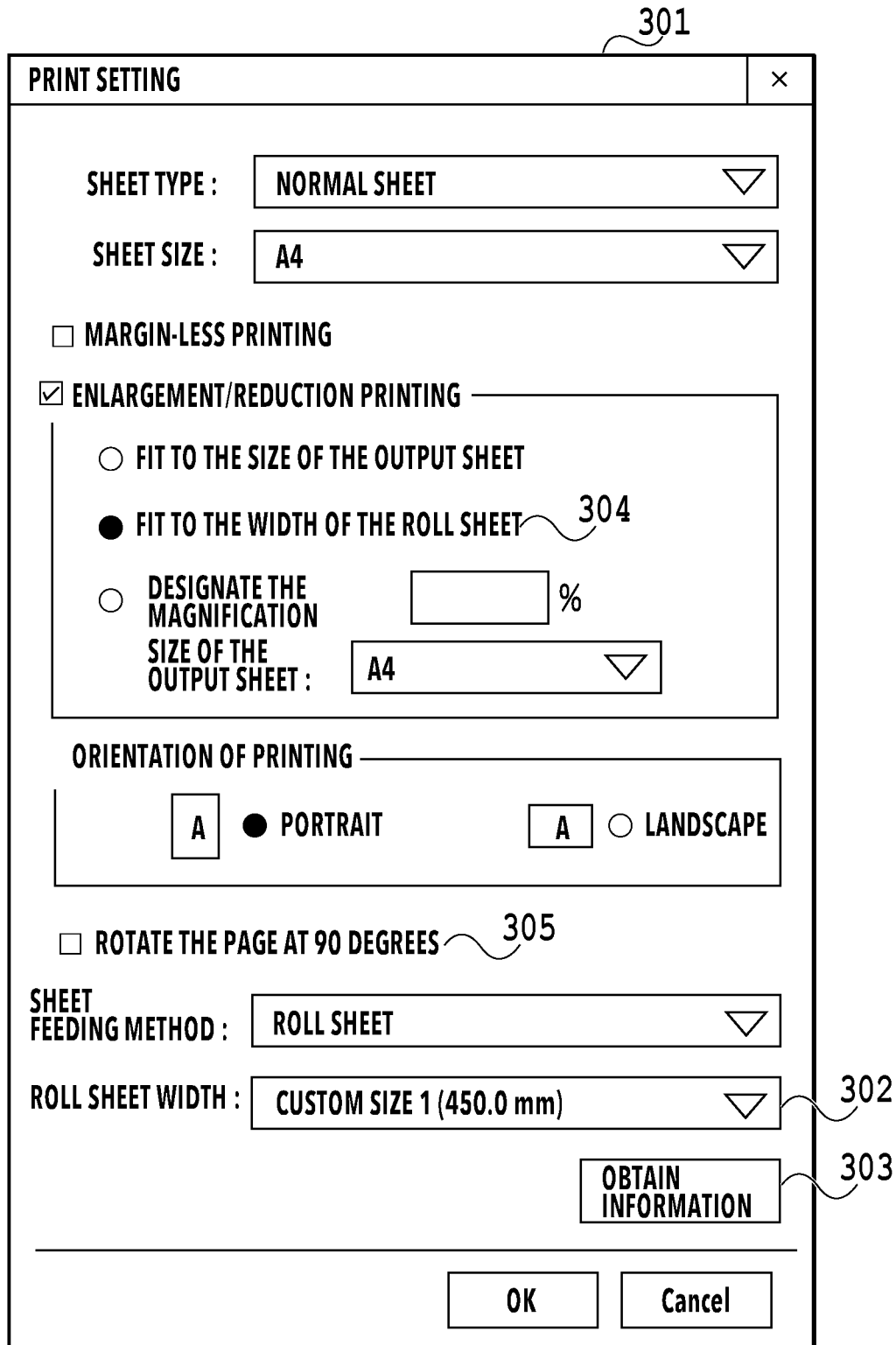
FIG. 3 is a diagram illustrating an example of a print settings screen for performing various kinds of settings of a printer driver.

FIG. 3 is a diagram illustrating an example of the print settings screen 301 for performing various kinds of settings of the printer driver provided by the user interface unit 202. The setting values selected by the user on the print settings screen 301 are to be the values of the print setting for the print job transmitted to the printer 2. The print settings screen 301 includes a combo box for selecting the type of sheet and setting the size of sheet. Further, on the print settings screen 301, setting for enlargement/reduction printing is possible, and fitting to the size of the output sheet and to the width of the roll sheet can be selected with the selection buttons. Designation of the magnification is also possible, so that a box for numerically inputting the magnification and a combo box for selecting the size of the output sheet are included.

Further, the print settings screen 301 includes a combo box for selecting the sheet feeding method, the "ROLL SHEET WIDTH" combo box 302 for setting the roll sheet width, and the "OBTAIN INFORMATION" button 303 for obtaining the width information of the roll sheet which is fed in the printer 2 and reflecting the width information in the printer driver.

Moreover, the print settings screen 301 includes an OK button, which is to be pressed for proceeding to the next screen after the setting is completed, and a Cancel button, which is for returning to the previous screen.

In the print system 10 of the present embodiment, as described above, in the "ROLL SHEET WIDTH" combo box 302 for setting the roll sheet width, it is possible to store information indicating three custom roll sheet widths in addition to information of the standard-sized roll sheet widths corresponding to the printer 2. By use of the combo box 302, it is possible for the user to select any one of multiple candidates, and the selected setting value is to be the value of the print setting for the print job transmitted to the printer 2. Hereinafter, the value selected with the combo box 302 to be the value of the print setting for the print job transmitted to the printer 2 is represented as the value in the selected state. Note that, in a case where the combo box 302 is closed (a state in which the multiple candidates that can be selected are not displayed in the combo box 302), the value in the selected state is displayed in the combo box 302.

Figure 4:
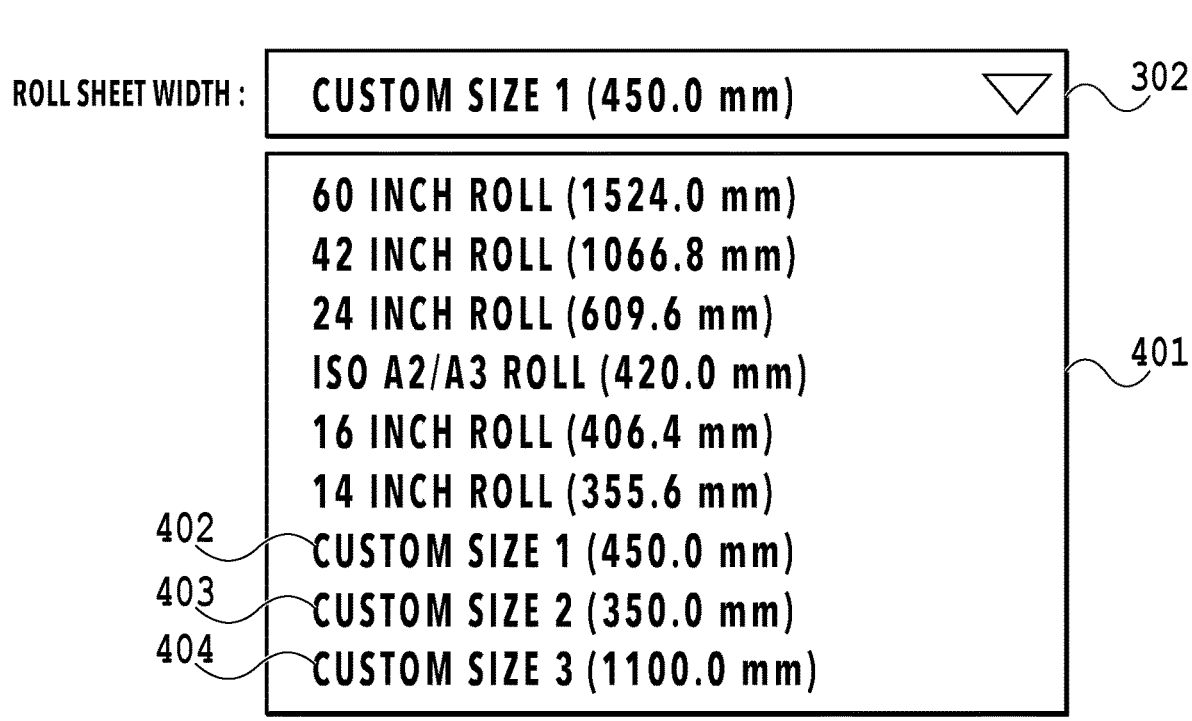
FIG. 4 is a diagram illustrating a "ROLL SHEET WIDTH" combo box and a list box.

FIG. 4 is a diagram illustrating the "ROLL SHEET WIDTH" combo box 302 and a list box 401 in which a list of selectable roll sheet widths, which is displayed at the timing where the "ROLL SHEET WIDTH" combo box 302 is selected and operated, is displayed. In the list box 401, in addition to the information of the standard-sized roll sheet widths, the three custom roll sheet widths are displayed in CUSTOM SIZES 1 to 3 (402, 403, 404) which are predetermined display areas. In the displayed case where the custom roll sheet widths are set, CUSTOM SIZE 1 is set as a width of "450.0 mm", CUSTOM SIZE 2 is set as a width of "350.0 mm", and CUSTOM SIZE 3 is set as a width of "1100.0 mm". Note that the number of custom roll sheet widths to be displayed is not limited to three as long as there are multiple custom roll sheet widths.

Figure 5:
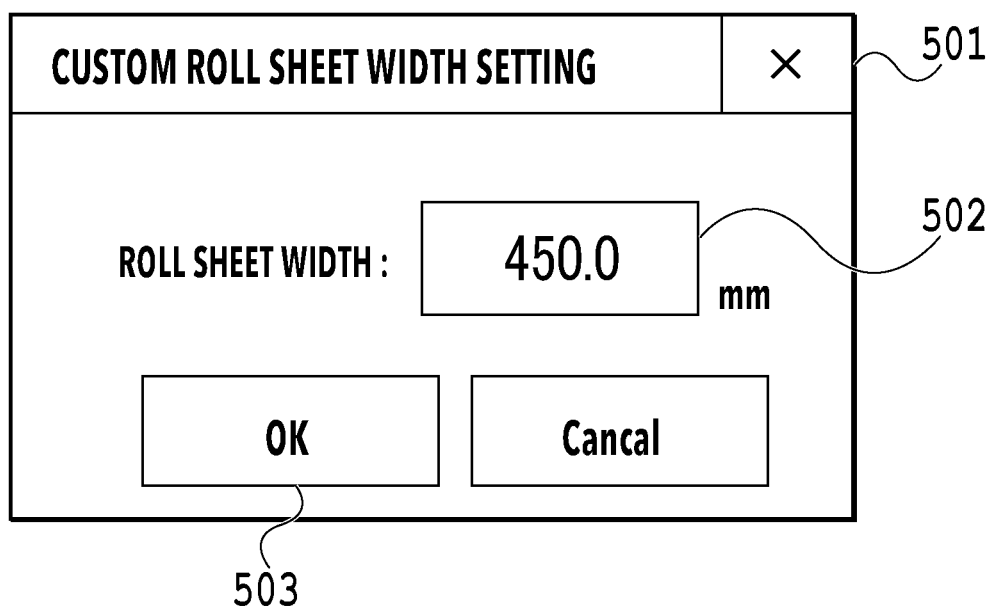
FIG. 5 is a diagram of a screen illustrating an example of a dialog for setting a custom roll sheet width.

FIG. 5 is a diagram of a screen illustrating an example of a dialog for setting the custom roll sheet width to be displayed in a case where any one of CUSTOM SIZES 1 to 3 (402, 403, 404) is selected in the roll sheet width list box 401. It is possible for the user to change and set the roll sheet width of the selected custom size to a given width by inputting the given roll sheet width in the "ROLL SHEET WIDTH" edit box 502 in the displayed custom roll sheet width setting dialog 501. In a case where there is no change in the roll sheet width after selecting a custom size, the OK button 503 is to be simply pressed without changing the "ROLL SHEET WIDTH" edit box 502.

FIG. 6 is a diagram illustrating the roll sheet width list 205 held by the printer driver 201. The roll sheet width list 205 stores information of the standard roll sheet widths corresponding to the printer 2 and information of the custom roll sheet widths held by the printer driver. Specifically, the roll sheet width list 205 stores the roll sheet width IDs to be internally handled by the printer driver 201, the character strings to be used for displaying in the "ROLL SHEET WIDTH" combo box 302 of the print setting, and the sizes of the roll sheet widths.

In a case where the "OBTAIN INFORMATION" button 303 is operated, the printer driver 201 obtains various kinds of information from the printer 2. In the present embodiment, it is assumed that information related to the width of the roll sheet which is set in the printer 2 is to be obtained. Then, as will be described in detail later, the information of the list to be displayed at the timing where the "ROLL SHEET WIDTH" combo box 302 is selected and operated is updated based on the obtained information. Therefore, in the present embodiment, it is assumed that the setting of the custom roll sheet widths is performed before obtaining the information related to the width of the roll sheet which is set in the printer 2. Then, the displaying of the custom roll sheet widths which are set before obtaining the information related to the width of the roll sheet which is set in the printer 2 is appropriately controlled after obtaining the information related to the width of the roll sheet which is set in the printer 2.

Figure 7:
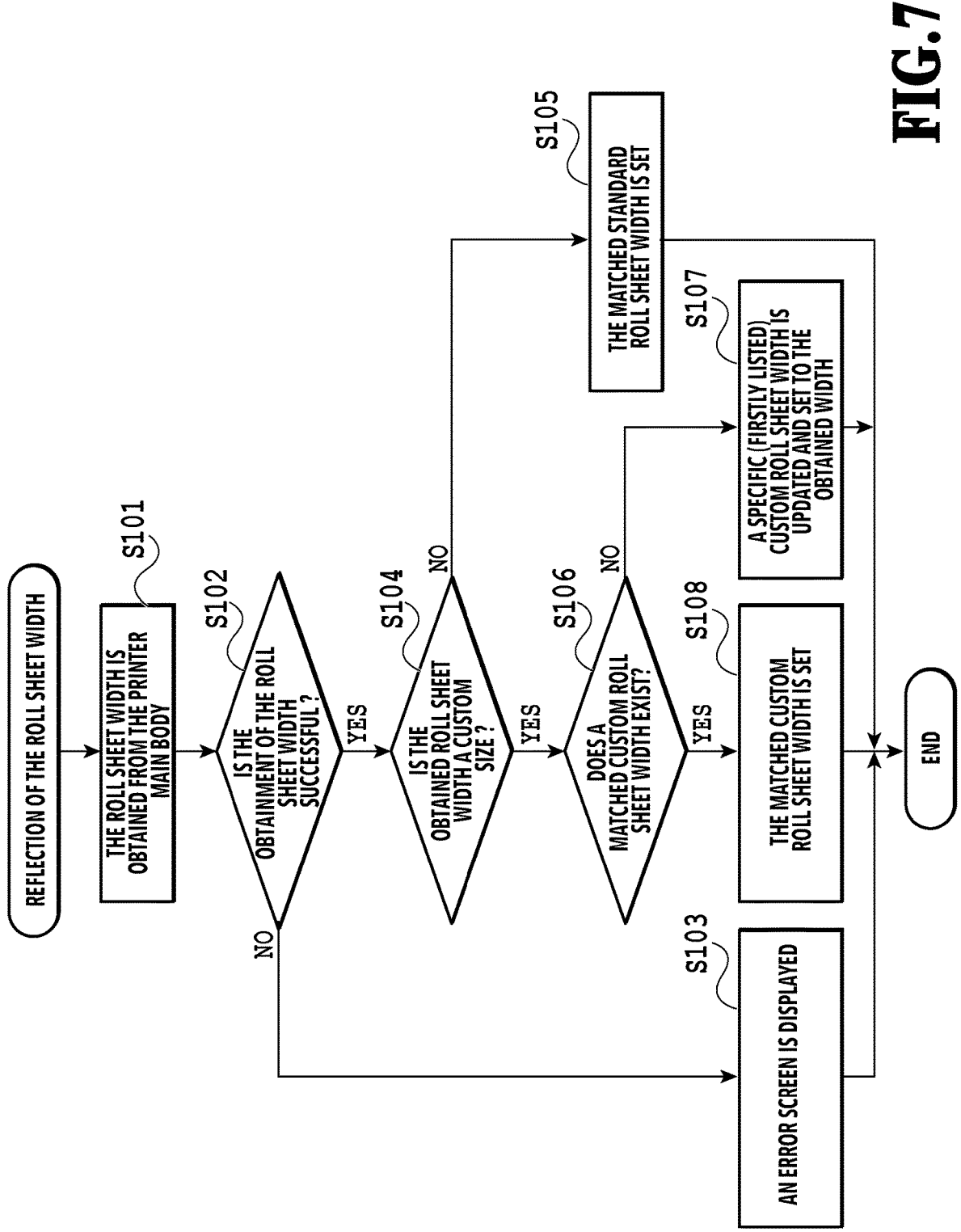
FIG. 7 is a flowchart illustrating processing of the printer driver.

FIG. 7 is a flowchart illustrating the processing of the printer driver to be executed in a case where the "OBTAIN INFORMATION" button 303 is pressed on settings screen 301 of the printer driver in the present embodiment. Hereinafter, the processing of the printer driver to be executed in the case where the "OBTAIN INFORMATION" button 303 is pressed will be explained with reference to this flowchart. Note that the main subject of the processing of the printer driver herein explained is the CPU 101, so that the processing is implemented if the CPU 101 reads a program from the ROM 103 or an external storage, which is not illustrated in the drawings, and executes the program.

If the "OBTAIN INFORMATION" button 303 is pressed and the processing is started, the CPU 101 communicates with the printer 2 via the bi-directional interface 3 in S101 and obtains the width information of the roll sheet which is set in the printer 2. Note that it is possible for the printer 2 to obtain the width information of the roll sheet which is set in itself (the information to be obtained by the printer driver of the host 1) by a given method. Specifically, for example, it is possible for the printer 2 to obtain the information by accepting input of the width information of the roll sheet which is set in itself from the user.

Further, for example, it is possible that the information is obtained by detecting the width of the roll sheet which is set in itself with a sensor capable of detecting the width of the roll sheet which is set in itself. Note that, in a case of the latter form, if an error may occur to in the detection result of the sensor, the detection result can be corrected in the printer 2. For example, it is also possible that, in a case where the difference between the detection result of the sensor and any one of the standard roll sheet widths is equal to or less than a predetermined threshold value, the detection result of the sensor is corrected to any one of the standard roll sheet widths. Note that the threshold value used for the above-mentioned determination can be changed to a given value.

Thereafter, the CPU 101 determines in S102 whether or not the information of the roll sheet width is successfully obtained from the printer 2. If the information of the roll sheet width is successfully obtained, the CPU 101 proceeds to S104, and, if the information of the roll sheet width is not successfully obtained, the CPU 101 proceeds to S103. In a case of proceeding to S103, the CPU 101 displays an error screen on the display 107 and ends the processing.

In a case of proceeding to S104, the CPU 101 determines whether or not the obtained roll sheet width is a custom size. Based on the obtained information of the roll sheet width, whether the roll sheet width matches any of the sizes of the standard roll sheet widths in the roll sheet width list 205 held by the printer driver is determined, and, if the roll sheet width does not match any of the standard roll sheet widths, it is determined that the roll sheet width is a custom size. Based on the obtained information, if the roll sheet width is a custom size, the CPU 101 proceeds to S106, and, if the roll sheet width is not a custom size, the CPU 101 proceeds to S105 since the obtained roll sheet width matches a standard roll sheet width. Then, in S105, the CPU 101 automatically sets the matched standard roll sheet width to the selected state by use of the printer driver without accepting selection from the user and ends the processing.

Figure 8:
FIG. 8 is a diagram illustrating a displayed screen for setting a roll sheet width.

Here, FIG. 8 is a diagram illustrating a displayed screen for setting the roll sheet width in S105. In a case where the roll sheet width obtained in S101 is "1524.0 mm", since the roll sheet width matches the standard roll sheet width "60 inch roll (1524.0 mm)" in the roll sheet width list 205 held by the printer driver in the determination of S104, "60 inch roll (1524.0 mm)" is set as the roll sheet width in S105.

In a case of proceeding to S106, the CPU 101 determines whether or not the roll sheet width corresponding to the information obtained from the printer 2 matches any of the custom roll sheet widths (CUSTOM SIZES 1 to 3) held by the printer driver. In a case of determining that the roll sheet width matches any of the custom roll sheet widths held by the printer driver, the CPU 101 proceeds to S108, so that none of the custom roll sheet widths (CUSTOM SIZES 1 to 3) is updated. Then, the matched custom roll sheet width is automatically set to the selected state by use of the printer driver without accepting selection from the user, and the processing is ended. Here, all of the custom sizes registered before an update are displayed on the display 107. Note that it is also possible that, in S106, the CPU 101 calculates and obtains the differences between the roll sheet width corresponding to the information obtained from the printer 2 and the respective custom roll sheet widths held by the printer driver. Further, it is also possible that, in a case where a difference equal to or less than a predetermined threshold value is included in the obtained differences, it is considered that the roll sheet width corresponding to the information obtained from the printer 2 matches a custom roll sheet width held by the printer driver. Specifically, the custom roll sheet width that is the calculation source of the difference equal to or less than the predetermined threshold value is considered to match the roll sheet width corresponding to the information obtained from the printer 2.

Figure 9:
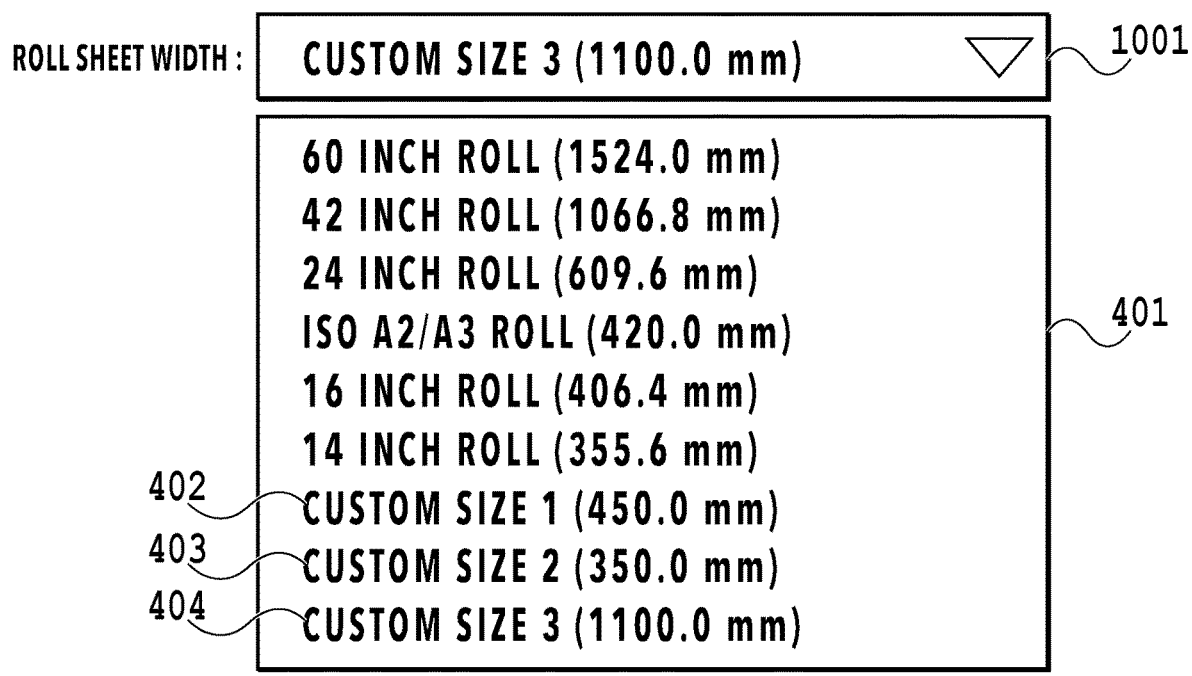
FIG. 9 is a diagram illustrating a displayed screen for setting a roll sheet width.

Here, FIG. 9 is a diagram illustrating an area to be displayed in a case where the user operates the combo box 302 after S108. In a case where the roll sheet width obtained in S101 is "1100.0 mm", since the roll sheet width does not match any of the standard roll sheet widths in the roll sheet width list 205 held by the printer driver in the determination of S104, it is determined that the roll sheet width is a custom size. Next, the CPU 101 determines whether the roll sheet width matches any of the held custom roll sheet widths (CUSTOM SIZES 1 to 3) (S106). Since the roll sheet width "1100.0 mm" matches CUSTOM SIZE 3, CUSTOM SIZE 3 (1100.0 mm) that matches the obtained roll sheet width is set as the roll sheet width in S108 without updating the custom roll sheet width, and the processing is ended.

In a case where, based on the information of the roll sheet width obtained from the printer 2, the roll sheet width does not match any of the custom roll sheet widths held by the printer driver in S106, the CPU 101 proceeds to S107. In S107, the CPU 101 updates a specific custom roll sheet width (for example, CUSTOM SIZE 1) to the obtained roll sheet width, then automatically sets the updated roll sheet width to the selected state by use of the printer driver without accepting selection from the user, and then ends the processing. Note that, here, since the specific custom roll sheet width is updated, in a case where the user operates the combo box 302 after S107 so that a list of sheet widths is displayed, the updated roll sheet width is included in the displayed list, and the roll sheet width before the update is not included.

Figure 10:
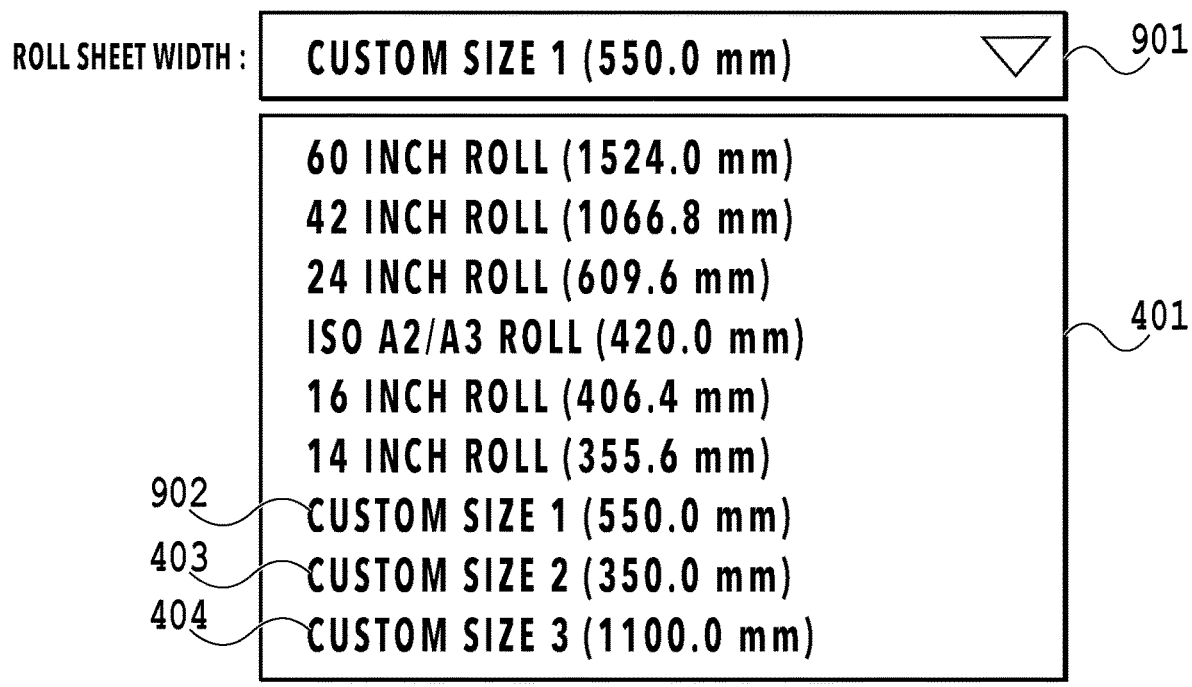
FIG. 10 is a diagram illustrating a displayed screen for setting a roll sheet width.

Here, FIG. 10 is a diagram illustrating an area to be displayed in a case where the user operates the combo box 302 after S107. In a case where the roll sheet width obtained in S101 is "550.0 mm", since the roll sheet width does not match any of the standard roll sheet widths in the roll sheet width list 205 held by the printer driver in the determination of S104, it is determined that the roll sheet width is a custom size. Thereafter, the CPU 101 determines whether the roll sheet width matches any of the held custom roll sheet widths (CUSTOM SIZES 1 to 3) in S106. Since the roll sheet width "550.0 mm" does not match any of the custom roll sheet widths, the CPU 101 updates a specific custom roll sheet width (for example, CUSTOM SIZE 1), then sets "550.0 mm" as the roll sheet width, and then ends the processing. In FIG. 10, the updated custom roll sheet width "550.0 mm" and, among the multiple custom sizes before the update, the custom sizes other than the specific custom size are displayed.

In this way, in a case where the width of the roll sheet which is fed in the printer 2 is a custom size, the CPU 101 determines in S106 whether a custom roll sheet width that matches the custom size exists. In a case where a custom roll sheet width that matches the custom size exists, the custom roll sheet widths are not updated and the existing custom roll sheet width that matches the custom size is selected, so that it is possible to prevent the same custom roll sheet width from being displayed on the roll sheet width list and prevent the operability from being decreased.

Note that the processing of FIG. 7 can be performed in the timings below other than the timing where the "OBTAIN INFORMATION" button 303 is pressed on the print settings screen 301 of the printer driver. It is possible to perform the processing at a timing where enlargement/reduction printing using a parameter of the roll sheet width is set (the "FIT TO THE WIDTH OF THE ROLL SHEET" radio button 304 is selected) or at a timing where 90-degree rotation is set (the setting of the "ROTATE THE PAGE AT 90 DEGREES" check box 305 is turned on). Further, it is also possible to perform the processing at a timing where the print settings screen 301 is displayed.

In this way, in registration of roll sheet widths for a printer driver, multiple custom roll sheet widths can be registered. As a result, it is possible to provide a print control device, print control method, and storage medium with which registration of roll sheet widths can be easily performed even in a case where printing is performed on multiple custom roll sheets.

Second Embodiment

Hereinafter, an explanation will be given of the second embodiment of the present invention with reference to the drawings. Note that the basic configuration of the present embodiment is the same as that of the first embodiment, and therefore the characteristic configurations will be explained below. It is possible to implement a print control device and a print control method with which setting of roll sheet widths can be easily performed even in a case where printing is performed on multiple custom roll sheets.

Figure 11:
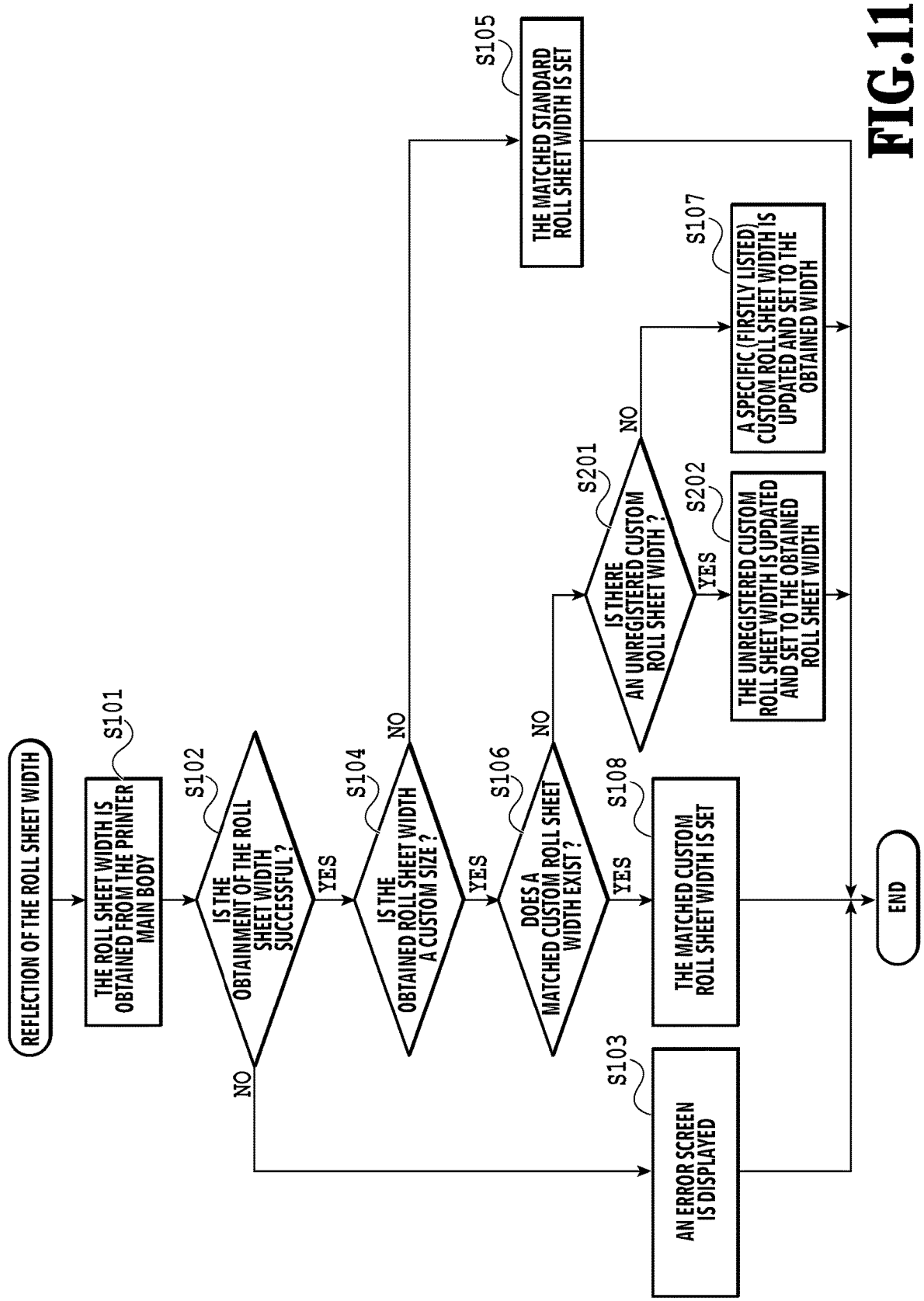
FIG. 11 is a flowchart illustrating processing of the printer driver.

FIG. 11 is a flowchart illustrating the processing of the printer driver to be executed in a case where the "OBTAIN INFORMATION" button 303 is pressed on settings screen 301 of the printer driver in the present embodiment. Hereinafter, the processing of the printer driver to be executed in the case where the "OBTAIN INFORMATION" button 303 is pressed will be explained with reference to this flowchart. Note that the main subject of the processing of the printer driver herein explained is the CPU 101, so that the processing is implemented if the CPU 101 reads a program from the ROM 103 or an external storage, which is not illustrated in the drawings, and executes the program. Note that, in the present embodiment, the processing in and after S201, which is in the case where it is determined to be NO in S106, that is, in the case where the matched custom roll sheet width does not exist in the custom roll sheet widths held by the printer driver, is different from the first embodiment. Therefore, the processing in and after S201 will be explained below.

In a case of proceeding from S106 to S201, the CPU 101 determines whether or not there is an unregistered area in the area where custom roll sheet widths can be registered for the printer driver. If there is an unregistered area according to the determination result, the processing proceeds to S202, and, if there is no unregistered area, the processing proceeds to S107. In a case of proceeding to S202, the obtained roll sheet width is registered in the unregistered area for the printer driver, and the processing is ended. The process of S107 is the same as that of the first embodiment.

Figure 12A:
FIG. 12A is a diagram illustrating a displayed screen for setting a roll sheet width.
Figure 12B:
FIG. 12B is a diagram illustrating a displayed screen for setting a roll sheet width.

Here, FIG. 12A and FIG. 12B are diagrams illustrating displayed screens for setting the roll sheet width in S202. In a case where the printer driver obtains the roll sheet width "1100.0 mm" from the printer, it is determined in S106 that a matched roll sheet width does not exist in the custom roll sheet widths (CUSTOM SIZES 1 to 3) of the printer driver. Then, in FIG. 12A, since the CUSTOM SIZE 3 is unregistered, it is determined in S201 that an unregistered custom roll sheet width (CUSTOM SIZE 3) exists. As illustrated in FIG. 12B, the obtained custom roll sheet width "1100.0 mm" is registered in this unregistered CUSTOM SIZE 3.

Note that, although there is only one unregistered custom roll sheet width in FIG. 12A, in a case where multiple unregistered custom roll sheet widths exist, the unregistered custom roll sheet width at the top in the order is updated. For example, in a case where CUSTOM SIZES 1, 2, and 3 are all unregistered, CUSTOM SIZE 1 is preferentially updated.

Third Embodiment

Hereinafter, an explanation will be given of the third embodiment of the present invention with reference to the drawings. Note that the basic configuration of the present embodiment is the same as that of the first embodiment, and therefore the characteristic configurations will be explained below.

Figure 13:
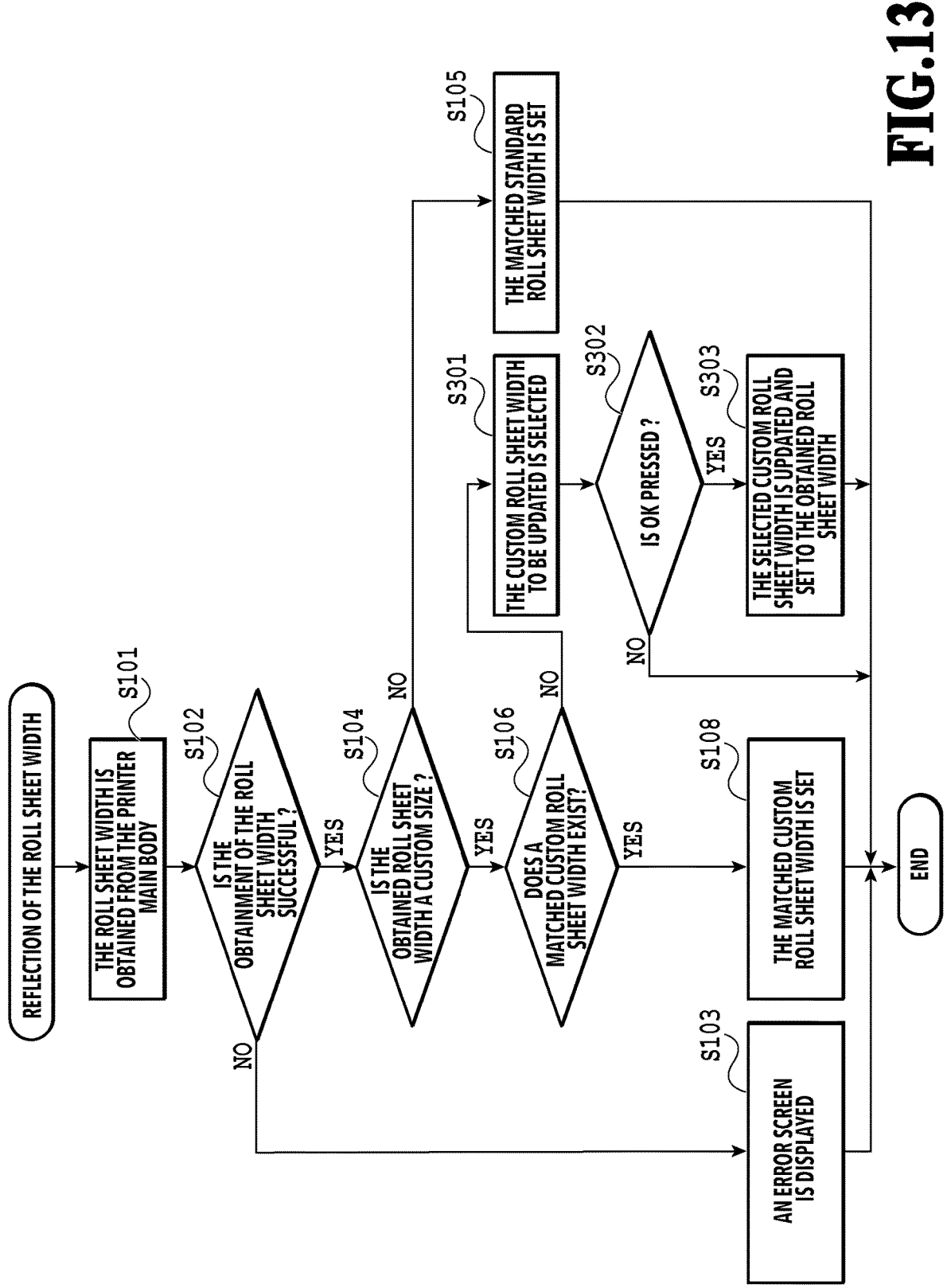
FIG. 13 is a flowchart illustrating processing of the printer driver.

FIG. 13 is a flowchart illustrating the processing of the printer driver to be executed in a case where the "OBTAIN INFORMATION" button 303 is pressed on settings screen 301 of the printer driver in the present embodiment. Hereinafter, the processing of the printer driver to be executed in the case where the "OBTAIN INFORMATION" button 303 is pressed will be explained with reference to this flowchart. Note that the main subject of the processing of the printer driver herein explained is the CPU 101, so that the processing is implemented if the CPU 101 reads a program from the ROM 103 or an external storage, which is not illustrated in the drawings, and executes the program. Note that, in the present embodiment, the processing in and after S301, which is in the case where it is determined to be NO in S106, that is, in the case where the matched custom roll sheet width does not exist in the custom roll sheet widths held by the printer driver, is different from the first embodiment. Therefore, the processing in and after S301 will be explained below.

In a case where "FIT TO THE WIDTH OF THE ROLL SHEET" is selected for enlargement/reduction printing or margin-less printing, if the width of the custom roll sheet which is fed in the printer is different from the custom roll sheet widths that are set for the driver, a desired print result cannot be obtained. Therefore, in the present embodiment, the width of the custom roll sheet which is fed in the printer is reflected in the driver, so that a desired print result can be obtained.

Figure 14:
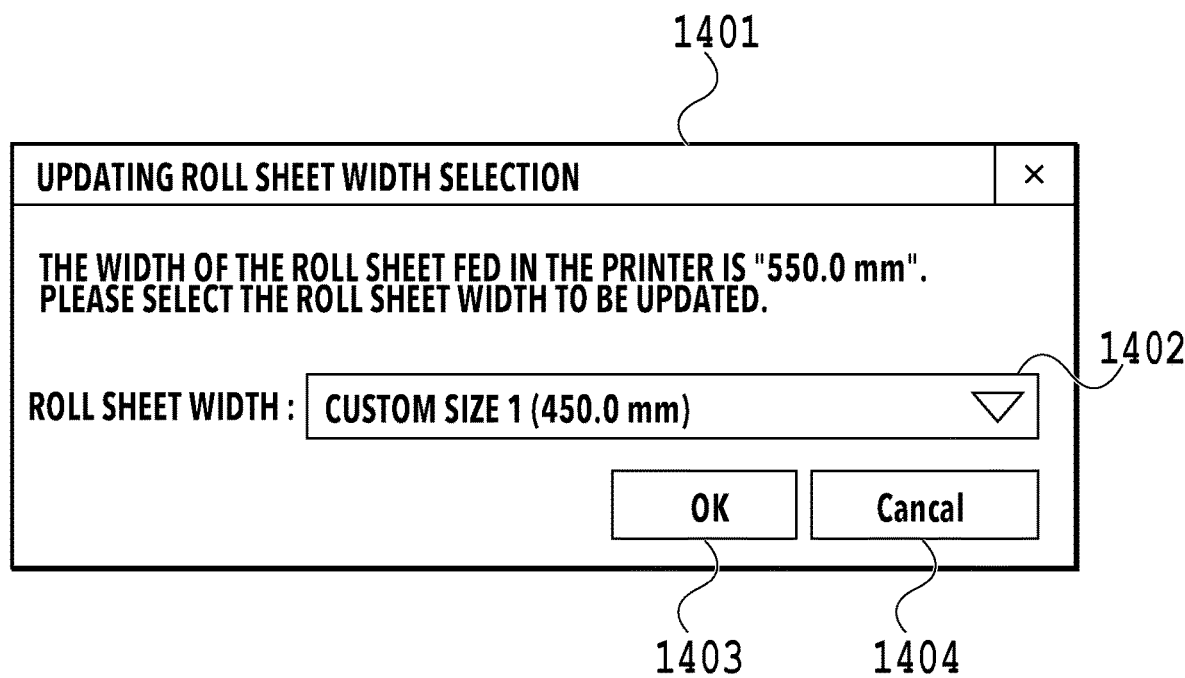
FIG. 14 is a diagram illustrating an updating roll sheet width selection screen.

In a case of proceeding from S106 to S301, the CPU 101 displays the updating roll sheet width selection screen 1401 illustrated in FIG. 14. The user can select a given custom size (CUSTOM SIZES 1 to 3) to be updated from the "ROLL SHEET WIDTH" combo box 1402 on the updating roll sheet width selection screen 1401.

If the user desires an update, an update can be performed by selecting a custom size from the "ROLL SHEET WIDTH" combo box 1402 and pressing the OK button 1403. The CPU 101 determines in S302 whether or not the OK button 1403 is pressed in S301, and, if the OK button 1403 is pressed, the CPU 101 proceeds to S303, and, if the OK button 1403 is not pressed, the CPU 101 waits for the Cancel button 1404 to be pressed. Further, if the Cancel button 1404 is pressed, the CPU 101 closes the updating roll sheet width selection screen 1401 and ends the processing. In a case of proceeding to S303, the CPU 101 updates the custom size selected by the user to the obtained roll sheet width and ends the processing.

Other Embodiments

The present invention can be implemented by processing of supplying a program for implementing one or more functions of the above-described embodiments to a system or a device via a network or a storage medium, so that one or more processors in a computer of the system or the device read out and execute the program. Furthermore, it is also possible to implement the present invention by use of a circuit (for example, an ASIC) for implementing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-103579 filed Jun. 16, 2020, which is hereby incorporated by reference herein in its entirety.

What is claimed is:

1. A print control device that is connectable to a printing apparatus, the print control device comprising:
    a storage unit configured to store information related to multiple custom sizes which are set by accepting input of a value from a user in a memory, wherein a predetermined number of the multiple custom sizes can be registered as a maximum;
    an obtaining unit configured to obtain information related to a size of a sheet which is set in the printing apparatus; and
    a display unit configured so that,
        in a case where the size corresponding to the information obtained by the obtaining unit does not match any of the multiple custom sizes corresponding to the information stored by the storage unit before the information is obtained by the obtaining unit, and in a case where a number of custom sizes included in the multiple custom sizes which are registered before the information is obtained by the obtaining unit is the predetermined number, a specific custom size among the multiple custom sizes corresponding to the information stored by the storage unit before the information is obtained by the obtaining unit is not displayed, and the size corresponding to the information obtained by the obtaining unit and the at least one custom size other than the specific custom size among the multiple custom sizes corresponding to the information stored by the storage unit before the information is obtained by the obtaining unit are displayed, and,
        in a case where the size corresponding to the information obtained by the obtaining unit does not match any one of the multiple custom sizes corresponding to the information stored by the storage unit before the information is obtained by the obtaining unit, and in a case where the number of custom sizes included in the multiple custom sizes which are registered before the information is obtained by the obtaining unit is less than the predetermined number, the size corresponding to the information obtained by the obtaining unit and all of the multiple custom sizes corresponding to the information stored by the storage unit before the information is obtained by the obtaining unit are displayed.

2. The print control device according to claim 1,
    wherein the storage unit further stores one or more standard sizes which are preset without accepting input of a value from the user,
    wherein, in a case where the size corresponding to the information obtained by the obtaining unit does not match any of the multiple custom sizes corresponding to the information stored by the storage unit before the information is obtained by the obtaining unit and the one or more standard sizes, the specific custom size is not displayed, and the size corresponding to the information obtained by the obtaining unit, the at least one custom size other than the specific custom size among the multiple custom sizes corresponding to the information stored by the storage unit before the information is obtained by the obtaining unit, and the one or more standard sizes are displayed, and
    wherein, in a case where the size corresponding to the information obtained by the obtaining unit matches any of the multiple custom sizes corresponding to the information stored by the storage unit before the information is obtained by the obtaining unit and the one or more standard sizes, all of the multiple custom sizes corresponding to the information stored by the storage unit before the information is obtained by the obtaining unit and the one or more standard sizes are displayed.

3. The print control device according to claim 1, wherein, in a case where the size corresponding to the information obtained by the obtaining unit does not match any of the multiple custom sizes corresponding to the information stored by the storage unit before the information is obtained by the obtaining unit, the information corresponding to the specific custom size stored by the storage unit is updated to the information obtained by the obtaining unit, so that the specific custom size is not displayed and the size corresponding to the information obtained by the obtaining unit is displayed.

4. The print control device according to claim 1, wherein, in a case where the size corresponding to the information obtained by the obtaining unit matches any of the multiple custom sizes corresponding to the information stored by the storage unit before the information is obtained by the obtaining unit, all of the multiple custom sizes corresponding to the information stored by the storage unit before the information is obtained by the obtaining unit are displayed.

5. The print control device according to claim 1 further comprising:
    a selection unit configured to select any of the displayed sizes; and
    a transmission unit configured to transmit a print job for performing printing on the sheet having the selected size to the printing apparatus.

6. The print control device according to claim 1,
    wherein differences between the size corresponding to the information obtained by the obtaining unit and the multiple custom sizes corresponding to the information stored by the storage unit before the information is obtained by the obtaining unit are respectively obtained, and
    wherein, in a case where a difference equal to or less than a predetermined threshold value is included in the obtained differences, all of the multiple custom sizes corresponding to the information stored by the storage unit before the information is obtained by the obtaining unit are displayed even though the size corresponding to the information obtained by the obtaining unit does not match any of the multiple custom sizes corresponding to the information stored by the storage unit before the information is obtained by the obtaining unit.

7. The print control device according to claim 1, wherein the sheet which is set in the printing apparatus is a roll sheet, and
wherein the size corresponding to the information obtained by the obtaining unit and the multiple custom sizes are sheet widths of roll sheets.

8. The print control device according to claim 1, wherein the specific custom size which is not displayed in a case where the size corresponding to the information obtained by the obtaining unit does not match any of the multiple custom sizes corresponding to the information stored by the storage unit before the information is obtained by the obtaining unit, and in a case where the number of the custom sizes included in the multiple custom sizes which are registered before the information is obtained by the obtaining unit is the predetermined number, is a custom size which is registered first.

9. A control method of a print control device that is connectable to a printing apparatus, the control method comprising:
a storage step configured to store information related to multiple custom sizes which are set by accepting input of a value from a user in a memory, wherein a predetermined number of the multiple custom sizes can be registered as a maximum;
an obtaining step configured to obtain information related to a size of a sheet which is set in the printing apparatus; and
a display step configured so that,
in a case where the size corresponding to the information obtained in the obtaining step does not match any of the multiple custom sizes corresponding to the information stored in the storage step before the information is obtained in the obtaining step, and in a case where a number of custom sizes included in the multiple custom sizes which are registered before the information is obtained in the obtaining step is the predetermined number, a specific custom size among the multiple custom sizes corresponding to the information stored in the storage step before the information is obtained in the obtaining step is not displayed, and the size corresponding to the information obtained in the obtaining step and the at least one custom size other than the specific custom size among the multiple custom sizes corresponding to the information stored in the storage step before the information is obtained in the obtaining step are displayed, and,
in a case where the size corresponding to the information obtained in the obtaining step does not match any one of the multiple custom sizes corresponding to the information stored in the storage step before the information is obtained in the obtaining step, and in a case where the number of custom sizes included in the multiple custom sizes which are registered before the information is obtained in the obtaining step is less than the predetermined number, the size corresponding to the information obtained in the obtaining step and all of the multiple custom sizes corresponding to the information stored in the storage step before the information is obtained in the obtaining step are displayed.

10. The control method according to claim 9,
wherein one or more standard sizes which are preset without accepting input of the value from the user are further stored in the storage step,
wherein, in a case where the size corresponding to the information obtained in the obtaining step does not match any of the multiple custom sizes corresponding to the information stored in the storage step before the information is obtained in the obtaining step and the one or more standard sizes, the specific custom size is not displayed, and the size corresponding to the information obtained in the obtaining step, the at least one custom size other than the specific custom size among the multiple custom sizes corresponding to the information stored in the storage step before the information is obtained in the obtaining step, and the one or more standard sizes are displayed; and
in a case where the size corresponding to the information obtained in the obtaining step matches any of the multiple custom sizes corresponding to the information stored in the storage step before the information is obtained in the obtaining step and the one or more standard sizes, all of the multiple custom sizes corresponding to the information stored in the storage step before the information is obtained in the obtaining step and the one or more standard sizes are displayed.

11. The control method according to claim 9,
wherein, in a case where the size corresponding to the information obtained in the obtaining step does not match any of the multiple custom sizes corresponding to the information stored in the storage step before the information is obtained in the obtaining step, the information corresponding to the specific custom size stored in the storage step is updated to the information obtained in the obtaining step, so that the specific custom size is not displayed and the size corresponding to the information obtained in the obtaining step is displayed.

12. The control method according to claim 9,
wherein, in a case where the size corresponding to the information obtained in the obtaining step matches any of the multiple custom sizes corresponding to the information stored in the storage step before the information is obtained in the obtaining step, all of the multiple custom sizes corresponding to the information stored in the storage step before the information is obtained in the obtaining step are displayed.

13. The control method according to claim 9, further comprising:
a selection step configured to select any of the displayed sizes,
a transmission step configured to transmit a print job for performing printing on the sheet having the selected size to the printing apparatus.

14. The control method according to claim 9,
wherein differences between the size corresponding to the information obtained in the obtaining step and the multiple custom sizes corresponding to the information stored in the storage step before the information is obtained in the obtaining step are respectively obtained, and
wherein, in a case where a difference equal to or less than a predetermined threshold value is included in the obtained differences, all of the multiple custom sizes corresponding to the information stored in the storage step before the information is obtained in the obtaining step are displayed even though the size corresponding to the information obtained in the obtaining step does not match any of the multiple custom sizes corresponding to the information stored in the storage step before the information is obtained in the obtaining step.

15. The control method of a print control device according to claim 9,
wherein the sheet which is set in the printing apparatus is a roll sheet, and
wherein the size corresponding to the information obtained in the obtaining step and the multiple custom sizes are sheet widths of roll sheets.

16. The control method of a print control device according to claim 9,
wherein the specific custom size which is not displayed in a case where the size corresponding to the information obtained in the obtaining step does not match any of the multiple custom sizes corresponding to the information stored in the storage step before the information is obtained in the obtaining step, and in a case where the number of custom sizes included in the multiple custom sizes which are registered before the information is obtained in the obtaining step is the predetermined number, is a custom size which is registered first.

17. A non-transitory computer readable storage medium storing a program for causing a computer to function as a print control device, the print control device comprising:
a storage unit configured to store information related to multiple custom sizes which are set by accepting input of a value from a user in a memory, wherein a predetermined number of the multiple custom sizes can be registered as a maximum;
an obtaining unit configured to obtain information related to a size of a sheet which is set in the printing apparatus; and
a display unit configured so that,
in a case where the size corresponding to the information obtained by the obtaining unit does not match any of the multiple custom sizes corresponding to the information stored by the storage unit before the information is obtained by the obtaining unit, and in a case where a number of custom sizes included in the multiple custom sizes which are registered before the information is obtained by the obtaining unit is the predetermined number, a specific custom size among the multiple custom sizes corresponding to the information stored by the storage unit before the information is obtained by the obtaining unit is not displayed, and the size corresponding to the information obtained by the obtaining unit and the at least one custom size other than the specific custom size among the multiple custom sizes corresponding to the information stored by the storage unit before the information is obtained by the obtaining unit are displayed, and,
in a case where the size corresponding to the information obtained by the obtaining unit does not match any one of the multiple custom sizes corresponding to the information stored by the storage unit before the information is obtained by the obtaining unit, and in a case where the number of custom sizes included in the multiple custom sizes which are registered before the information is obtained by the obtaining unit is less than the predetermined number, the size corresponding to the information obtained by the obtaining unit and all of the multiple custom sizes corresponding to the information stored by the storage unit before the information is obtained by the obtaining unit are displayed.

18. The storage medium storing the program according to claim 17, wherein the program is a printer driver.

* * * * *